(12) United States Patent
Terai

(10) Patent No.: US 10,865,859 B2
(45) Date of Patent: Dec. 15, 2020

(54) CONTINUOUSLY VARIABLE TRANSMISSION

(71) Applicant: NISSAN MOTOR CO., LTD., Yokohama (JP)

(72) Inventor: Hiromu Terai, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/461,935

(22) PCT Filed: Nov. 24, 2016

(86) PCT No.: PCT/JP2016/084826
§ 371 (c)(1),
(2) Date: May 17, 2019

(87) PCT Pub. No.: WO2018/096621
PCT Pub. Date: May 31, 2018

(65) Prior Publication Data
US 2019/0323581 A1    Oct. 24, 2019

(51) Int. Cl.
*F16H 9/12*       (2006.01)
*F16H 37/08*      (2006.01)
*F16H 47/06*      (2006.01)
*F16H 61/30*      (2006.01)
*F16H 61/662*     (2006.01)

(52) U.S. Cl.
CPC ............ *F16H 9/12* (2013.01); *F16H 37/0846* (2013.01); *F16H 47/065* (2013.01); *F16H 61/30* (2013.01); *F16H 61/66263* (2013.01); *F16H 2037/0886* (2013.01)

(58) Field of Classification Search
CPC ......... F16H 61/66272; F16H 61/66259; F16H 59/14; F16H 61/662
USPC .......................................................... 474/28
See application file for complete search history.

(56) References Cited

U.S. PATENT DOCUMENTS 5,108,348 A * 4/1992 Bornmann ........ F16H 61/66272
474/18
6,243,638 B1  6/2001 Abo et al.
6,287,227 B1 * 9/2001 Vahabzadeh ...... F16H 61/66259
474/18

(Continued)

FOREIGN PATENT DOCUMENTS

EP  1 218 654 B1   6/2003
JP  2000-193075 A  7/2000

(Continued)

*Primary Examiner* — Henry Y Liu
(74) *Attorney, Agent, or Firm* — Foley & Lardner LLP

(57) ABSTRACT

An object of the present invention is to provide a continuously variable transmission in which a magnitude relationship between a piston area of a primary pulley and a piston area of a secondary pulley is specified. As means for achieving the object, a continuously variable transmission includes: an electric oil pump disposed in an oil path between a piston oil chamber of a primary pulley and a piston oil chamber of a secondary pulley; and a controlling portion configured to control the entry and exit of oil in the piston oil chamber of the primary pulley by the electric oil pump. A piston area of the primary pulley in the continuously variable transmission is smaller than a piston area of the secondary pulley.

1 Claim, 9 Drawing Sheets

(56) References Cited

U.S. PATENT DOCUMENTS

| | | | | |
|---|---|---|---|---|
| 6,739,994 | B1* | 5/2004 | Van Rooij | F16H 61/0031 474/18 |
| 6,890,275 | B1* | 5/2005 | Piepenbrink | F16H 61/66263 474/18 |
| 7,074,144 | B2* | 7/2006 | Nobu | F16H 61/66272 474/18 |
| 7,192,372 | B2* | 3/2007 | Sawada | F16H 61/66272 474/28 |
| 7,387,589 | B2* | 6/2008 | Suzuki | F16H 61/66254 474/12 |
| 7,546,196 | B2* | 6/2009 | Izumi | F16H 61/66254 474/18 |
| 7,575,528 | B2* | 8/2009 | Plath | F16H 55/56 474/28 |
| 7,686,715 | B2* | 3/2010 | Carlson | F16H 63/065 474/18 |
| 8,857,382 | B2* | 10/2014 | Yagasaki | F16H 61/0025 123/2 |
| 9,816,610 | B2* | 11/2017 | Van Rooij | F16H 61/66259 |
| 10,364,887 | B2* | 7/2019 | Van Rooij | F16H 61/66272 |
| 2004/0254047 | A1 | 12/2004 | Frank et al. | |
| 2006/0069486 | A1 | 3/2006 | Yamaguchi et al. | |
| 2010/0035721 | A1 | 2/2010 | Rothenbuhler et al. | |

FOREIGN PATENT DOCUMENTS

| | | |
|---|---|---|
| JP | 2002-523711 A | 7/2002 |
| JP | 2006-90474 A | 4/2006 |
| JP | 2006-523292 A | 10/2006 |
| JP | 2008-240894 A | 10/2008 |
| JP | 2011-85175 A | 4/2011 |
| JP | 2016-11728 A | 1/2016 |

* cited by examiner

CONTINUOUSLY VARIABLE TRANSMISSION

TECHNICAL FIELD

The present invention relates to a continuously variable transmission.

BACKGROUND ART

JP 2002-523711 A discloses a continuously variable transmission for controlling entry and exit of oil in a primary pulley oil chamber by an electric oil pump disposed in an oil path between the primary pulley oil chamber and a secondary pulley oil chamber.

SUMMARY OF INVENTION

However, the above literature does not mention a magnitude relationship between a piston area of a primary pulley and a piston area of a secondary pulley. The piston area of the primary pulley and the piston area of the secondary pulley are important factors affecting an output requested to the electric oil pump at the time of a shift, for example. That is, the continuously variable transmission of the above literature has room for improvement in terms of the magnitude relationship between the piston area of the primary pulley and the piston area of the secondary pulley.

In view of such a circumstance, the present invention is intended to provide a continuously variable transmission in which a magnitude relationship between a piston area of a primary pulley and a piston area of a secondary pulley is specified.

According to one embodiment of this invention, a continuously variable transmission comprises an electric oil pump disposed in an oil path between a piston oil chamber of a primary pulley and a piston oil chamber of a secondary pulley, and a controlling portion configured to control entry and exit of oil in the piston oil chamber of the primary pulley by the electric oil pump. Then, a piston area of the primary pulley is smaller than a piston area of the secondary pulley.

DESCRIPTION OF EMBODIMENTS

With reference to the drawings and so on, the following describes embodiments of the present invention.

First Embodiment

Figure 1:
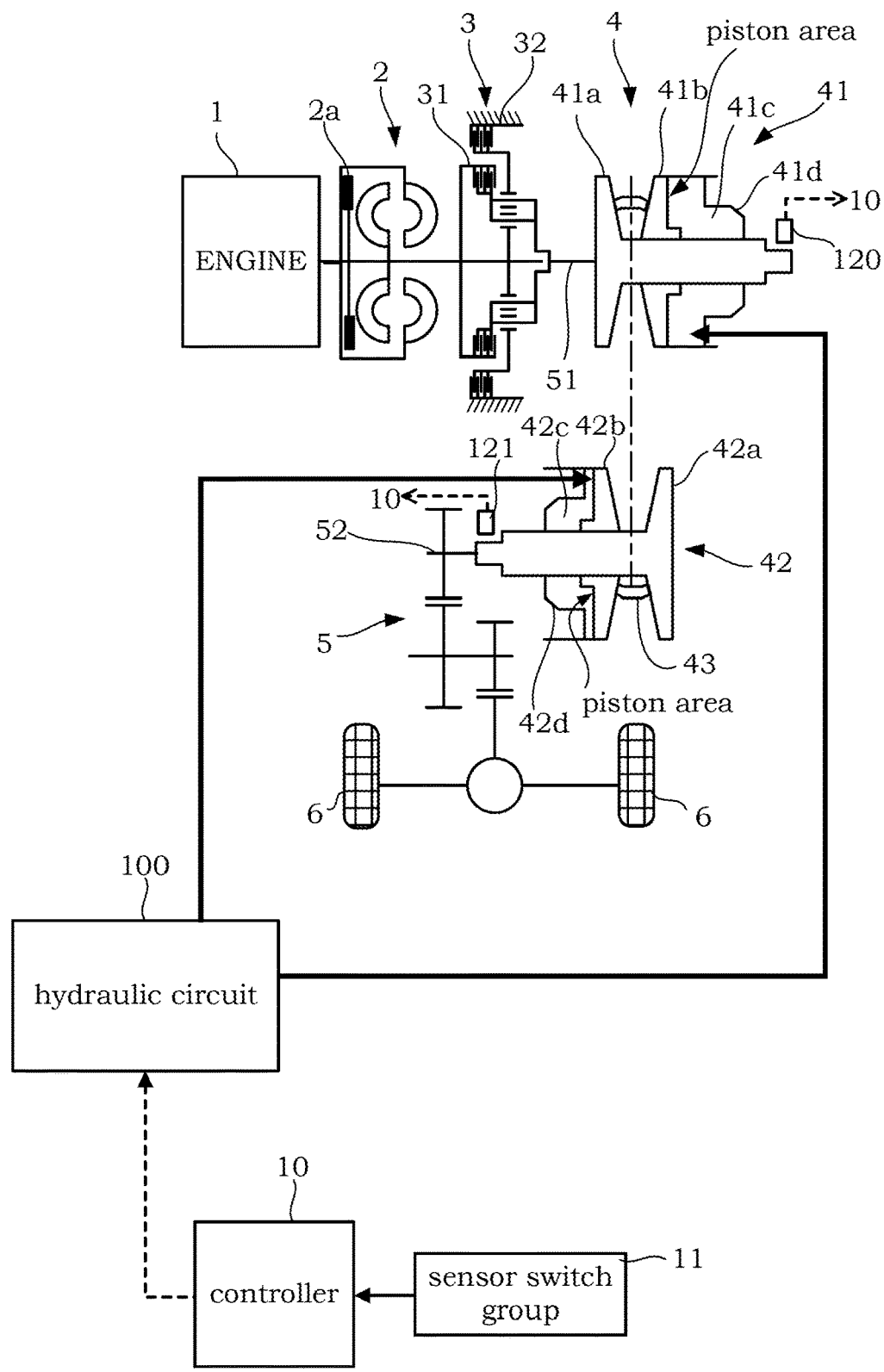
FIG. 1 is a schematic configuration diagram of a vehicle.

FIG. 1 is a schematic configuration diagram of a vehicle. The vehicle includes an engine 1, a torque converter 2 equipped with a lock-up clutch 2a, a forward/reverse switching mechanism 3, a variator 4, a final reduction mechanism 5, driving wheels 6, and a hydraulic circuit 100.

The engine 1 constitutes a drive source for the vehicle. The output of the engine 1 is transmitted to the driving wheels 6 via the torque converter 2, the forward/reverse switching mechanism 3, the variator 4, and the final reduction mechanism 5. Accordingly, as well as the torque converter 2, the forward/reverse switching mechanism 3, and the final reduction mechanism 5, the variator 4 is provided in a power transmission path via which power is transmitted from the engine 1 to the driving wheels 6.

The forward/reverse switching mechanism 3 is provided between the torque converter 2 and the variator 4 in the abovementioned power transmission path. The forward/reverse switching mechanism 3 switches a rotation direction of a rotation to be input between a forward direction corresponding to forward travel and a reverse direction corresponding to reverse travel.

More specifically, the forward/reverse switching mechanism 3 includes a forward clutch 31 and a reverse brake 32. The forward clutch 31 is engaged when the rotation direction is the forward direction. The reverse brake 32 is engaged when the rotation direction is the reverse direction. Either the forward clutch 31 or the reverse brake 32 can be configured as a clutch that intermits a rotation between the engine 1 and the variator 4.

The variator 4 includes a primary pulley 41, a secondary pulley 42, and a belt 43 wound around the primary pulley 41 and the secondary pulley 42. In the following description, primary is also referred to as PRI, and secondary is also referred to as SEC. The variator 4 constitutes a belt continuously variable transmission mechanism configured to perform a shift by changing groove widths of the PRI pulley 41 and the SEC pulley 42 to change a winding diameter of the belt 43 (hereinafter also just referred to as the "winding diameter").

The PRI pulley 41 includes a fixed pulley 41a fixed to a primary shaft 51, and a movable pulley 41b facing the fixed pulley 41a and supported to be movable in an axis direction of the primary shaft 51 but relatively non-rotatable. A piston 41d fixed to the primary shaft 51 is provided on the opposite side from the fixed pulley 41a across the movable pulley 41b, so that a PRI pulley oil chamber 41c as a piston oil chamber is formed between the fixed pulley 41a and the piston 41d. When a controller 10 controls an amount of oil to be supplied to the PRI pulley oil chamber 41c, the movable pulley 41b operates, so that the groove width of the PRI pulley 41 is changed.

The SEC pulley 42 includes a fixed pulley 42a fixed to a secondary shaft 52, and a movable pulley 42b facing the fixed pulley 42a and supported to be movable in an axis direction of the secondary shaft 52 but relatively non-rotatable. A piston 42d fixed to the secondary shaft 52 is provided on the opposite side from the fixed pulley 42a across the movable pulley 42b, so that an SEC pulley oil chamber 42c as a piston oil chamber is formed between the fixed pulley 42a and the piston 42d. When the controller 10 controls an amount of oil to be supplied to the SEC pulley oil chamber 42c, the movable pulley 42b operates, so that the groove width of the SEC pulley 42 is changed.

The belt 43 is wound on a sheave surface having a V-shape formed by the fixed pulley 41a and the movable pulley 41b of the PRI pulley 41 and a sheave surface having a V-shape formed by the fixed pulley 42a and, the movable pulley 42b of the SEC pulley 42.

The final reduction mechanism 5 transmits an output rotation from the variator 4 to the driving wheels 6. The final reduction mechanism 5 includes a plurality of gear trains and a differential gear. The final reduction mechanism 5 rotates the driving wheels 6 via an axle.

The hydraulic circuit 100 supplies a hydraulic pressure to the variator 4, more specifically, the PRI pulley 41 and the SEC pulley 42. The hydraulic circuit 100 also supplies a hydraulic pressure to the forward/reverse switching mechanism 3 and the lock-up clutch 2a, and also to a lubrication system and a cooling system (not shown). The hydraulic circuit 100 is more specifically configured as follows.

Figure 2:
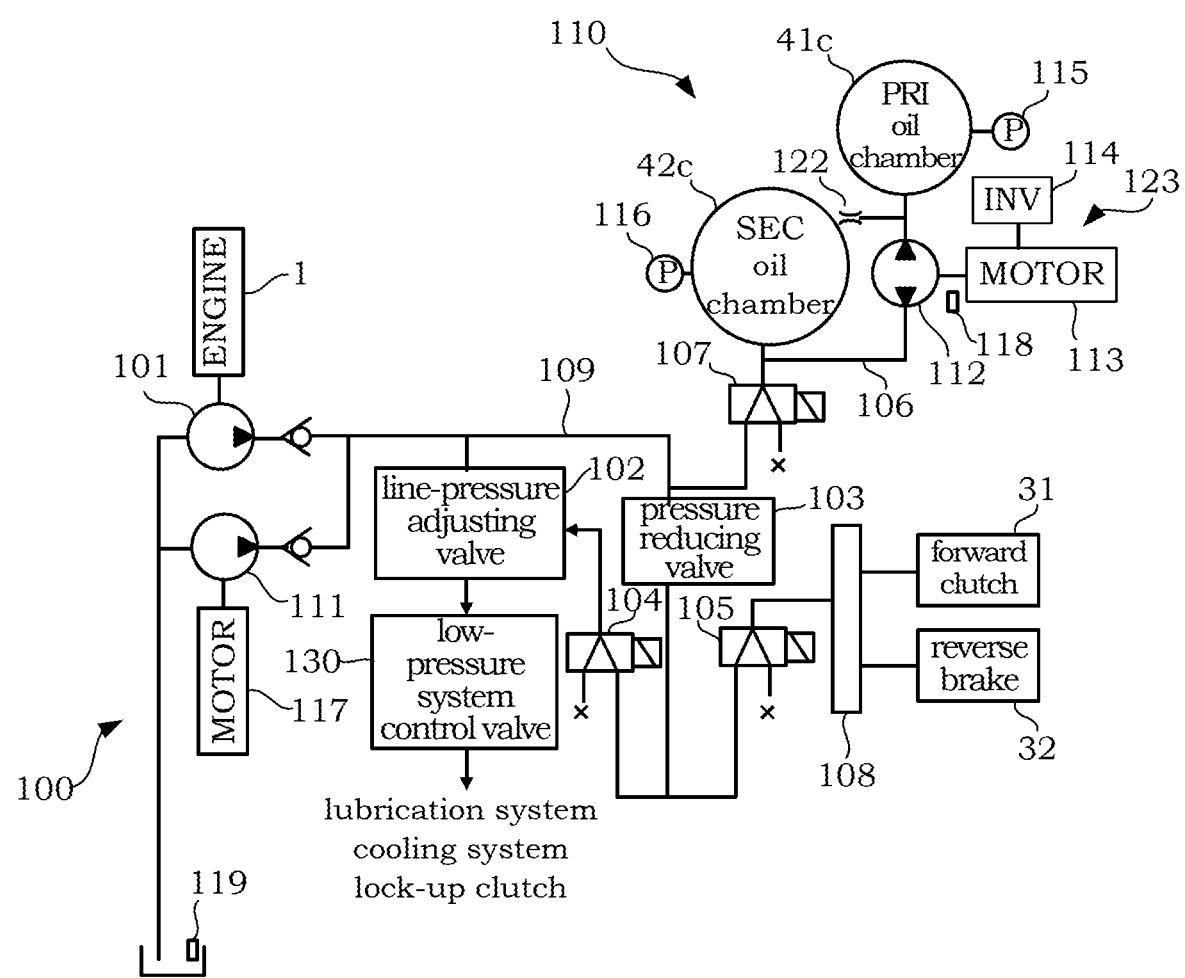
FIG. 2 is a schematic configuration diagram of a hydraulic circuit.

FIG. 2 is a schematic configuration diagram of the hydraulic circuit 100. The hydraulic circuit 100 includes a source-pressure oil pump 101, a line-pressure adjusting valve 102, a pressure reducing valve 103, a line pressure solenoid valve 104, a forward/reverse switching mechanism solenoid valve 105, a shift circuit pressure solenoid valve 107, a manual valve 108, a line-pressure oil path 109, a low-pressure system control valve 130, a shift circuit 110, and a line-pressure electric oil pump 111. In the following description, the solenoid valve is referred to as SOL.

The source-pressure oil pump 101 is a mechanical oil pump driven by power of the engine 1. The source-pressure oil pump 101 is connected to the line-pressure adjusting valve 102, the pressure reducing valve 103, the shift circuit pressure SOL 107, and the shift circuit 110 via the line-pressure oil path 109. The line-pressure oil path 109 constitutes an oil path for a line pressure. The line pressure is a hydraulic pressure as a source pressure for a PRI pressure and an SEC pressure.

The line-pressure electric oil pump 111 is driven by an electric motor 117. When the engine 1 stops due to an idling stop control and the source-pressure oil pump 101 stops along with this, for example, the line-pressure electric oil pump 111 operates to supply the line pressure.

The line-pressure adjusting valve 102 generates a line pressure by adjusting a hydraulic pressure generated by the oil pump 101. That the oil pump 101 generates a line pressure includes a case where a line pressure is generated due to such an action of the line-pressure adjusting valve 102. Oil relieved from the line-pressure adjusting valve 102 in a pressure control is supplied to the lock-up clutch 2a, the lubrication system, and the cooling system via the low-pressure system control valve 130.

The pressure reducing valve 103 reduces the line pressure. The hydraulic pressure reduced by the pressure reducing valve 103 is supplied to the line pressure SOL 104 and the forward/reverse switching mechanism SOL 105.

The line pressure SOL 104 is a linear solenoid valve and generates a controlled hydraulic pressure corresponding to a control current. The controlled hydraulic pressure generated by the line pressure SOL 104 is supplied to the line-pressure adjusting valve 102, and the line-pressure adjusting valve 102 operates in accordance with the controlled hydraulic pressure thus generated by the line pressure SOL 104 so as to perform a pressure control. On this account, a command value for a line pressure PL can be set by the control current to the line pressure SOL 104.

The forward/reverse switching mechanism SOL 105 is a linear solenoid valve and generates a hydraulic pressure corresponding to a control current. The hydraulic pressure generated by the forward/reverse switching mechanism SOL 105 is supplied to the forward clutch 31 and the reverse brake 32 via the manual valve 108 operating in response to the operation by a driver.

The shift circuit pressure SOL 107 is a linear solenoid valve and generates a hydraulic pressure to be supplied to the shift circuit 110 in accordance with a control current. On this account, a command value for a shift circuit pressure can be set by the control current to the shift circuit pressure SOL 107. The shift circuit pressure generated by the shift circuit pressure SOL 107 is supplied to a shift oil path 106. The shift circuit pressure may be generated, for example, by an SOL that generates a controlled hydraulic pressure corresponding to a control current, and a regulating valve that generates a control circuit pressure from a line pressure PL in accordance with the controlled hydraulic pressure thus generated by the SOL.

The shift circuit 110 includes the shift oil path 106 connected to the line-pressure oil path 109 via the shift circuit pressure SOL 107, and a shift oil pump 112 interposed in the shift oil path 106. The PRI pulley oil chamber 41c communicates with the SEC pulley oil chamber 42c via the shift oil path 106. Further, the shift oil path 106 is provided with a branch path branching off from between the shift oil pump 112 and the PRI pulley oil chamber 41c. The branch path is provided with an orifice 122, and oil is discharged from the orifice 122 to the outside of the shift oil path 106. More specifically, the orifice 122 is formed in a part of the oil path so as to be reduced in diameter, and an end of the orifice 122 on the opposite side from a branching-off point in the shift oil path 106 is opened. Oil continuously leaks out from this open end. In a case where oil is supplied to the PRI pulley oil chamber 41c by the shift oil pump 112, the oil partially leaks out from the orifice 122. The oil thus discharged outside the shift oil path 106 from the orifice is discharged into a space inside a case of the continuously variable transmission. As such, the outside of the shift oil path 106 (ahead of the orifice 122) of the present embodiment is a space, but the outside of the shift oil path 106 (ahead of the orifice 122) may be an oil path with a hydraulic pressure lower than that of the shift oil path 106. That is, the outside of the shift oil path 106 should be a place where the hydraulic pressure is lower than that of the shift oil path 106. Note that the orifice 122 is one example of an oil discharge mechanism.

The shift oil pump 112 is driven by an electric motor 113 and can change a rotation direction between a normal direction and an opposite direction via an inverter 114. The normal direction as used herein is a direction where the oil is sent from the SEC pulley oil chamber 42c side to the PRI pulley oil chamber 41c side, and the opposite direction is a direction where the oil is sent from the PRI pulley oil chamber 41c side to the SEC pulley oil chamber 42c side. Note that, in the following description, the shift oil pump 112, the electric motor 113, and the inverter 114 may be generally referred to as an electric oil pump 123.

When the shift oil pump 112 rotates in the normal direction, oil in the shift oil path 106 and the SEC pulley oil chamber 42c is supplied to the PRI pulley oil chamber 41c. Hereby, the movable pulley 41b of the PRI pulley 41 moves in a direction approaching the fixed pulley 41a, so that the groove width of the PRI pulley 41 is reduced. In the meantime, the movable pulley 42b of the SEC pulley 42 moves in a direction distanced from the fixed pulley 42a, so that the groove width of the SEC pulley 42 is increased. Note that, at the time when the shift oil pump 112 rotates in the normal direction, the oil is supplied from the line-pressure oil path 109 to the shift oil path 106 so that a hydraulic pressure (hereinafter also referred to as "SEC-side hydraulic pressure") of the shift oil path 106 on the SEC pulley oil chamber 42c side (hereinafter also referred to as "SEC side") from the shift oil pump 112 does not fall below the command value for the shift circuit pressure. The command value for the shift circuit pressure is set in consideration of prevention of slip of the belt 43, and so on. Note that a hydraulic pressure of the shift oil path 106 on the PRI pulley oil chamber 41c side (hereinafter also referred to as "PRI side") from the shift oil pump 112 is also referred to as a PRI-side hydraulic pressure.

Further, when the shift oil pump 112 rotates in the opposite direction, the oil flows out from the PRI pulley oil chamber 41c. Hereby, the movable pulley 41b of the PRI pulley 41 moves in a direction distanced from the fixed pulley 41a, so that the groove width of the PRI pulley 41 is increased. In the meantime, the movable pulley 42b of the SEC pulley 42 moves in a direction approaching the fixed pulley 42a, so that the groove width of the SEC pulley 42 is reduced. When the oil thus flowing out from the PRI pulley oil chamber 41c flows into the shift oil path 106, the SEC-side hydraulic pressure rises but is controlled by the shift circuit pressure SOL 107 so that the SEC-side hydraulic pressure does not exceed the command value. That is, when the SEC-side hydraulic pressure exceeds the command value, the oil is discharged from the shift oil path 106 via the shift circuit pressure SOL 107. In the meantime, when the SEC-side hydraulic pressure is less than the command value, the oil flows into the shift oil path 106 from the line-pressure oil path 109 via the shift circuit pressure SOL 107.

As described above, in the continuously variable transmission of the present embodiment, a shift is performed by controlling the entry and exit of oil in the PRI pulley oil chamber 41c by the shift oil pump 112. The summary of a shift control will be described later. Note that the control on a force (clamping force) to clamp the belt 43 to prevent slip of the belt 43 is performed by controlling the hydraulic pressure to be supplied to the SEC pulley oil chamber 42c.

Referring back to FIG. 1, the vehicle further includes the controller 10. The controller 10 is an electronic control device, and a signal from a sensor switch group 11 is input into the controller 10. Note that the controller 10 is constituted by a microcomputer including a central processing unit (CPU), a read only memory (ROM), a random access memory (RAM), and an input-output interface (I/O interface). The controller 10 can be constituted by a plurality of microcomputers.

The sensor switch group 11 includes, for example, an accelerator pedal opening sensor for detecting an accelerator pedal opening of the vehicle, a brake sensor for detecting a brake pedal force of the vehicle, a vehicle speed sensor for detecting a vehicle speed Vsp, and an engine rotation speed sensor for detecting a rotation speed NE of the engine 1.

The sensor switch group 11 further includes, for example, a PRI pressure sensor 115 for detecting a PRI pressure, an SEC pressure sensor 116 for detecting an SEC pressure, a PRI rotation speed sensor 120 for detecting an input-side rotation speed of the PRI pulley 41, an SEC rotation speed sensor 121 for detecting an output-side rotation speed of the SEC pulley 42, a pump rotation speed sensor 118 for detecting a rotation speed of the shift oil pump 112, and an oil temperature sensor 119 for detecting an oil temperature. The signal from the sensor switch group 11 may be input into the controller 10 via other controllers, for example. This also applies to a signal of information or the like generated by other controllers based on the signal from the sensor switch group 11.

The controller 10 controls the hydraulic circuit 100 based on the signal from the sensor switch group 11. More specifically, the controller 10 controls the line pressure SOL 104 and the shift circuit 110 illustrated in FIG. 2. The controller 10 is further configured to control the forward/reverse switching mechanism SOL 105 and the shift circuit pressure SOL 107.

At the time of controlling the line pressure SOL 104, the controller 10 applies, to the line pressure SOL 104, a control current corresponding to a command value for the line pressure PL.

At the time of executing a shift control, the controller 10 sets a target speed ratio based on the signal from the sensor switch group 11. When the target speed ratio is determined, the winding diameters (target winding diameters) of the pulleys 41, 42 to achieve the target speed ratio are determined. When the target winding diameters are determined, the groove widths (target groove widths) of the pulleys 41, 42 to achieve the target winding diameters are determined.

Further, in the shift circuit 110, the movable pulley 41b of the PRI pulley 41 moves in accordance with the entry and exit of oil in the PRI pulley oil chamber 41c by the shift oil pump 112, and the movable pulley 42b of the SEC pulley 42 also moves along with this. That is, a moving amount of the movable pulley 41b of the PRI pulley 41 has correlation with a moving amount of the movable pulley 42b of the SEC pulley 42.

In view of this, the controller 10 operates the shift oil pump 112 so that a position of the movable pulley 41b of the PRI pulley 41 comes to a position corresponding to the target speed ratio. Whether or not the movable pulley 41b is placed at a desired position is determined in such a manner that an actual speed ratio is calculated from detection values of the PRI rotation speed sensor 120 and the SEC rotation speed sensor 121, and it is determined whether the actual speed ratio agrees with the target speed ratio or not.

Further, the operation of the shift oil pump 112 by the controller 10 is not limited to the time when a shift is performed. Even in a case where the target speed ratio does not change, when oil leaks out from the pulley oil chambers 41c, 42c, and the actual speed ratio changes, the controller 10 operates the shift oil pump 112. In the present embodiment, such a control to maintain the target speed ratio is also included in the shift control.

That is, the shift control of the present embodiment is a feedback control to cause the position of the movable pulley 41b of the PRI pulley 41 to converge to its target position. Further, a controlled target in the feedback control is not the hydraulic pressure of each of the pulley oil chambers 41c, 42c, but the groove width of the PRI pulley 41, in other words, the position of the movable pulley 41b.

Note that a sensor for detecting the position of the movable pulley 41b may be provided to determine whether or not the movable pulley 41b is placed at a position corresponding to the target speed ratio.

Here, a reason why the orifice 122 is provided will be described below. The electric motor 113 has such a characteristic that the accuracy of a control on a rotation number remarkably decreases when a command value of the rotation number is extremely small. Accordingly, an oil flow rate F that can be discharged in a state where the shift oil pump 112 maintains control accuracy has a lower limit. On this account, in a case where a flow rate (also referred to as a leak flow rate) Fb to leak out in the PRI pulley oil chamber 41c is smaller than the lower limit (also referred to as a minimum flow rate Fmin) of the oil flow rate F, for example, it is difficult to compensate an amount of the leak with accuracy. In view of this, the orifice 122 is provided, and even in a case where the leak flow rate Fb is smaller than the minimum flow rate Fmin, the minimum flow rate Fmin is discharged from the shift oil pump 112 so as to be partially discharged via the orifice 122. Hereby, the oil is supplied to the PRI pulley oil chamber 41c by the same amount as the leak flow rate Fb. Note that the orifice 122 is one example of an oil discharge mechanism, and the invention is not limited to this. For example, an opening/closing valve may be usable. In a case where an opening/closing valve is used, an opening/closing control may be performed only in a case where the leak flow rate Fb is smaller than the minimum flow rate Fmin. This makes it possible to restrain a wasteful outflow of the oil.

In the meantime, on designing a continuously variable transmission, there is a demand to form the electric oil pump 123 as small as possible, from the viewpoint of cost, size, weight, and the like. Meanwhile, the electric motor 113 must be able to generate an output necessary for a shift. That is, when the output requested to the electric motor 113 for a shift is reduced, it is possible to downsize the electric oil pump 123. In view of this, the present embodiment focuses on a magnitude relationship between a piston area (hereinafter also referred to as "PRI piston area") of the PRI pulley 41 and a piston area (hereinafter also referred to as "SEC piston area") of the SEC pulley 42, so as to achieve downsizing of the electric oil pump 123. The following describes the magnitude relationship between the PRI piston area and the SEC piston area with reference to FIG. 3.

Figure 3:
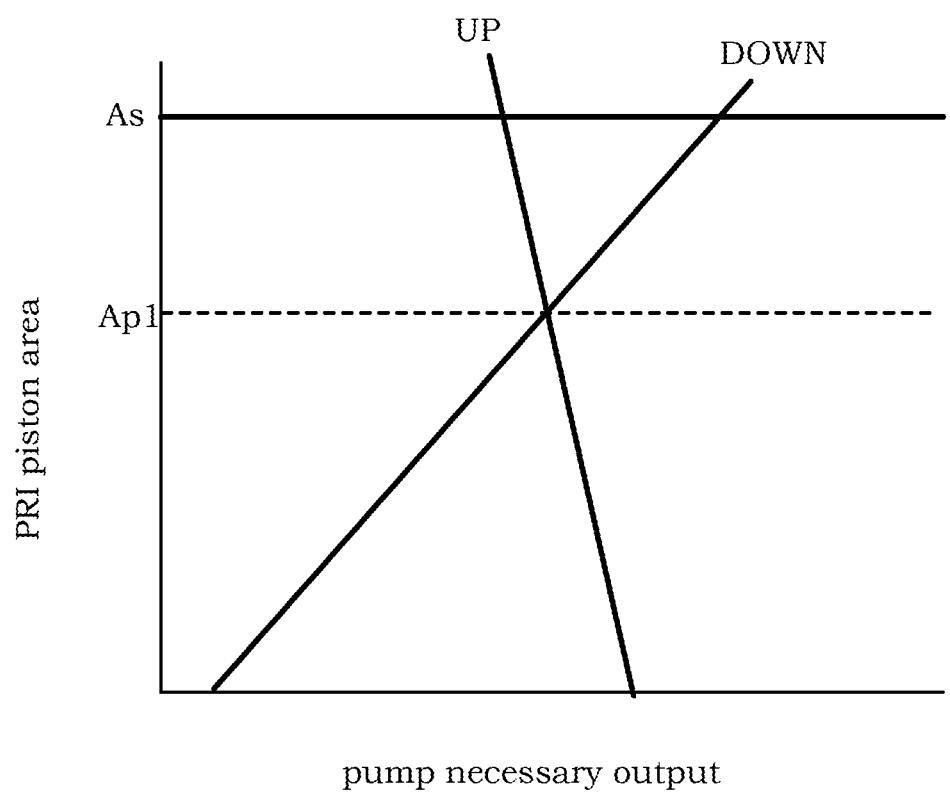
FIG. 3 is a view illustrating a relationship between a pump necessary output and a PRI piston area.

FIG. 3 is a view illustrating a relationship between a pump necessary output and a PRI piston area in a case where the PRI piston area is changed while the SEC piston area is fixed. The "pump necessary output" as used herein is a pump output requested to the electric oil pump 123 to perform a shift, that is, an output of the electric motor 113 necessary to perform a shift.

Note that, in FIG. 3, it is assumed that a shift speed (hereinafter also referred to as "down-shift speed") at the time of a down-shift is higher than a shift speed (hereinafter also referred to as "up-shift speed") at the time of an up-shift. The reason is as follows. The down-shift is performed in a case where immediate acceleration is requested, e.g., a case where so-called kick down corresponding to stepping on an accelerator pedal is performed or a case where a speed ratio is returned to the low side for restart or re-acceleration at the time of deceleration. Accordingly, the shift speed requested for the down-shift is higher than the shift speed requested for the up-shift. Further, FIG. 3 illustrates a case where the up-shift speed and the down-shift speed are respective predetermined speeds, and when those shift speeds are changed, the inclinations of characteristic lines in the figure also change.

First, the following describes a reason why the pump necessary output in the down-shift is larger than the pump necessary output in the up-shift in a case where the PRI piston area is equal to the SEC piston area (As in the figure).

A differential thrust to be generated at the time of a shift is expressed by Equation (1).

$$Fsa=(Vp/Np)\times C \quad (1)$$

Fsa: differential thrust, Vp: PRI pulley speed, Np: PRI rotation number, C: constant determined by characteristic of belt Since the PRI rotation number Np can be also considered as an engine rotation number, it is found, from Equation (1), that the differential thrust is large when the engine rotation number is low. That is, the down-shift to be performed mainly when the engine rotation number is low has a differential thrust larger than that in the up-shift.

Since the pump necessary output is expressed by a product between a shift speed and a differential thrust, the pump necessary output is larger in the down-shift than in the up-shift.

Next will be described a reason why the pump necessary output becomes smaller in the down-shift as the PRI piston area is smaller.

The output (hereinafter also referred to as "pump output") of the electric oil pump 123 is expressed by Equation (2).

$$P\text{pump}=\Delta P\times Qp \quad (2)$$

Ppump: pump output, ΔP: before-after differential pressure of electric oil pump, Qp: flow rate passing through electric oil pump The before-after differential pressure ΔP and the passage flow rate Qp of the electric oil pump 123 in the down-shift are expressed by Equations (3) and (4), respectively.

$$\Delta P=Ps-Pp \quad (3)$$

Pp: PRI pressure, Ps: SEC pressure $$Qp=Ap\times Vp \quad (4)$$

Ap: PRI piston area

From Equation (4), it is found that the passage flow rate Qp decreases as the PRI piston area Ap is made smaller in the down-shift.

Further, a PRI thrust and a SEC thrust are expressed by Equations (5) and (6), respectively.

$$Fp=Ap\times Pp \quad (5)$$

$$Fs=As\times Ps \quad (6)$$

Fp: PRI thrust, Fs: SEC thrust, Ap: PRI piston area, As: SEC piston area, Pp: PRI pressure, Ps: SEC pressure Since the SEC thrust is larger than the PRI thrust in the down-shift, a differential thrust Fsa is expressed by Equation (7).

$$Fsa=Fs-Fp \quad (7)$$

When Equation (1), Equation (5), and Equation (6) are substituted for Equation (7), Equation (8) is provided.

$$Pp=(As\cdot Ps-Vp\cdot C/Np)/Ap \quad (8)$$

From Equation (8), it is found that, in the down-shift, the PRI pressure increases as the PRI piston area is made smaller. When Equation (3) is substituted for Equation (8), Equation (9) is provided.

$$\Delta P=Ps-(As\cdot Ps-Vp\cdot C/Np)/Ap \quad (9)$$

From Equation (9), it is found that, in the down-shift, the before-after differential pressure ΔP of the electric oil pump 123 becomes smaller as the PRI piston area is made smaller.

As described above, in the down-shift, as the PRI piston area is made smaller, the passage flow rate Qp of the electric oil pump 123 decreases, and the before-after differential pressure ΔP also decreases. Accordingly, from Equation (2), it is found that the pump output Ppump also decreases. Accordingly, as illustrated in FIG. 3, as the PRI piston area becomes smaller, the pump necessary output in the down-shift decreases.

In the meantime, in the up-shift, the PRI thrust is larger than the SEC thrust, so that a differential thrust is expressed by Equation (10).

$$Fsa=Fp-Fs \qquad (10)$$

Further, a before-after differential pressure ΔP of the electric oil pump 123 in the up-shift is expressed by Equation (11). Note that a passage flow rate Qp of the electric oil pump 123 is the same as Equation (4).

$$\Delta P=Pp-Ps \qquad (11)$$

When Equation (1) and Equation (11) are substituted for Equation (9), Equation (12) is provided.

$$Pp=(As \cdot Ps-Vp \cdot C/Np)/Ap \qquad (12)$$

From Equation (12), it is found that, in the up-shift, the PRI pressure increases as the PRI piston area is made smaller.

When Equation (12) is substituted for Equation (11), Equation (13) is provided.

$$\Delta P=(As \cdot Ps-Vp \cdot C/Np)/Ap-Ps \qquad (13)$$

From Equation (13), it is found that, in the up-shift, as the PRI piston area is made smaller, the before-after differential pressure ΔP of the electric oil pump 123 becomes larger.

As described above, in the up-shift, as the PRI piston area is made smaller, the before-after differential pressure ΔP of the electric oil pump 123 increases. However, the passage flow rate Qp of the electric oil pump 123 decreases. Accordingly, as illustrated in FIG. 3, the pump output Ppump increases, but the change amount of the pump necessary output relative to the change amount of the PRI piston area is small as compared to the down-shift.

Next will be described setting of the PRI piston area.

It is necessary for the electric oil pump 123 to satisfy the pump necessary output both in the down-shift and in the up-shift. That is, a higher one out of a pump necessary output satisfying a down-shift request and a pump necessary output satisfying an up-shift request is an output requested to the electric oil pump 123.

As illustrated in FIG. 3, in a case of PRI piston area≥SEC piston area, the pump necessary output satisfying the down-shift request is higher than the pump necessary output satisfying the up-shift request. Accordingly, the output requested to the electric oil pump 123 is the pump necessary output satisfying the down-shift request.

Even in a case of PRI piston area≤SEC piston area, when the PRI piston area is larger than Ap1, the output requested to the electric oil pump 123 is the pump necessary output satisfying the down-shift request. However, the pump necessary output satisfying the down-shift request is smaller than that in the case of PRI piston area≥SEC piston area.

When the PRI piston area is Ap1, the pump necessary output satisfying the down-shift request is equal to the pump necessary output satisfying the up-shift request.

When the PRI piston area becomes smaller than Ap1, the pump necessary output satisfying the up-shift request becomes higher than the pump necessary output satisfying the down-shift request. That is, the output requested to the electric oil pump 123 is the pump necessary output satisfying the up-shift request. The pump necessary output satisfying the up-shift request becomes larger as the PRI piston area becomes smaller. Accordingly, as the PRI piston area becomes smaller than Ap1, the output requested to the electric oil pump 123 becomes larger. However, the change of the pump necessary output satisfying the up-shift request is more moderate than the change of the pump necessary output satisfying the down-shift request as described above. Accordingly, the output requested to the electric oil pump 123 is small as compared to the case of PRI piston area≥SEC piston area.

In view of this, in the present embodiment, the PRI piston area is set to be smaller than the SEC piston area. Hereby, the output requested to the electric oil pump 123 can be decreased. Stated differently, a smaller electric motor 113 can be used. As a result, it is possible to achieve downsizing of the electric oil pump.

Note that, in a case where the output requested to the electric oil pump 123 is decreased more, the PRI piston area is set to Ap1, that is, an area in which the pump necessary output satisfying the down-shift request is equal to the pump necessary output satisfying the up-shift request.

Next will be described other effects to be provided by setting the PRI piston area to be smaller than the SEC piston area.

Figure 4:
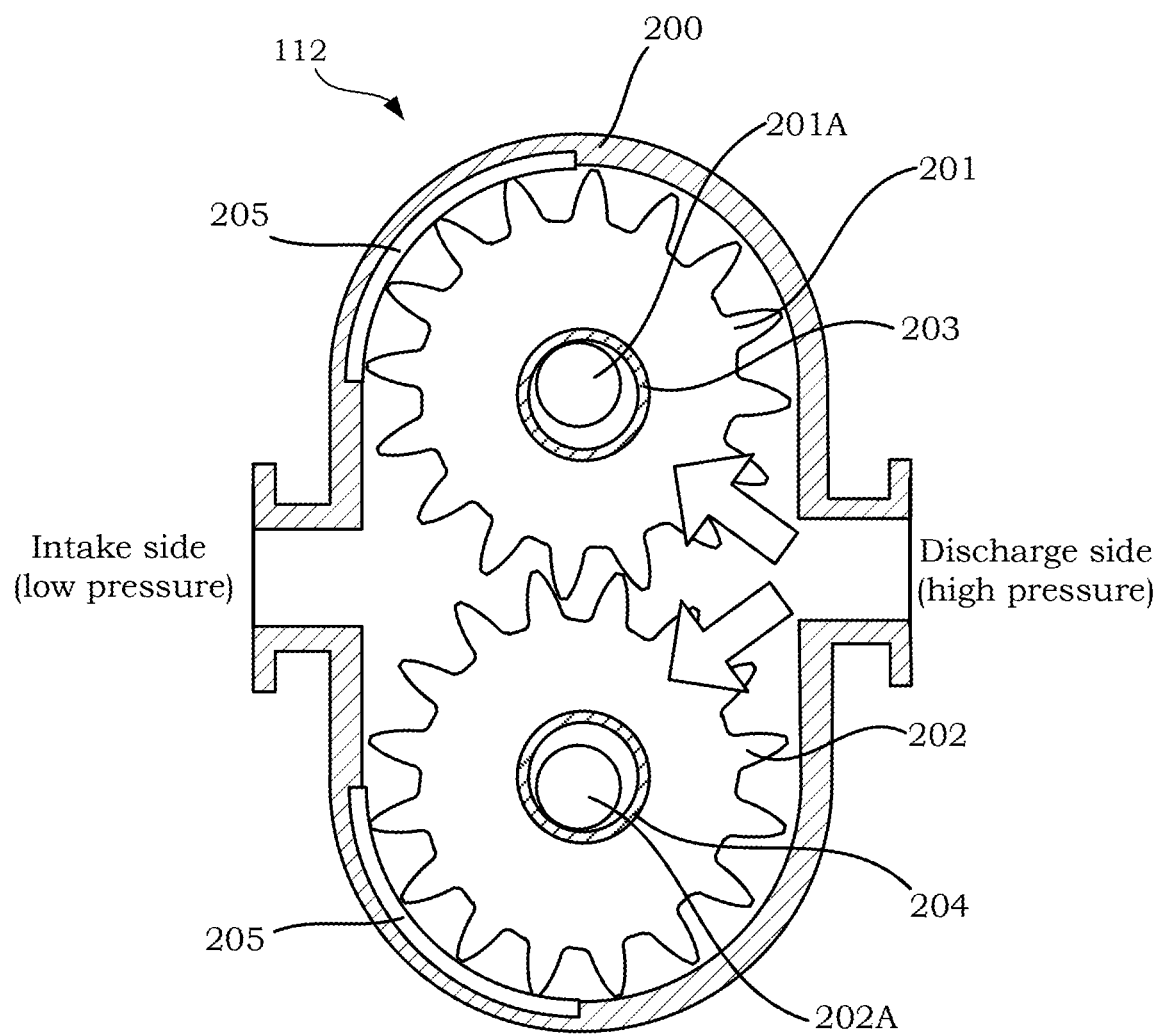
FIG. 4 is a sectional view illustrating a configuration of an electric oil pump.

FIG. 4 is a view illustrating a structure of the shift oil pump 112. The shift oil pump 112 includes two gear wheels 201, 202 inside a housing 200. The two gear wheels 201, 202 mesh with each other and rotate, so that oil is taken in from an inlet by a suction force caused due to the rotation and is discharged from an outlet.

When the speed ratio is maintained to be constant, the two gear wheels 201, 202 stop. At this time, due to a pressing force (arrows in the figure) to be caused by a differential pressure between a discharge side (high pressure) and an intake side (a low pressure), the gear wheel 201 moves toward the intake side just by a clearance between a bearing 203 and a rotating shaft 201A, so that teeth tips of the gear wheel 201 are pressed against an inner peripheral wall (a sealing portion 205 in the figure) of the housing 200. Similarly, teeth tips of the gear wheel 202 are pressed against a sealing portion 205. Further, the two gear wheels 201, 202 mesh with each other as described above. Hereby, an oil sealing property between the intake side and the discharge side is attained.

In other words, it may be said that a state where no differential pressure is caused between the discharge side and the intake side is an unstable state from the viewpoint of the oil sealing property.

Figure 5:
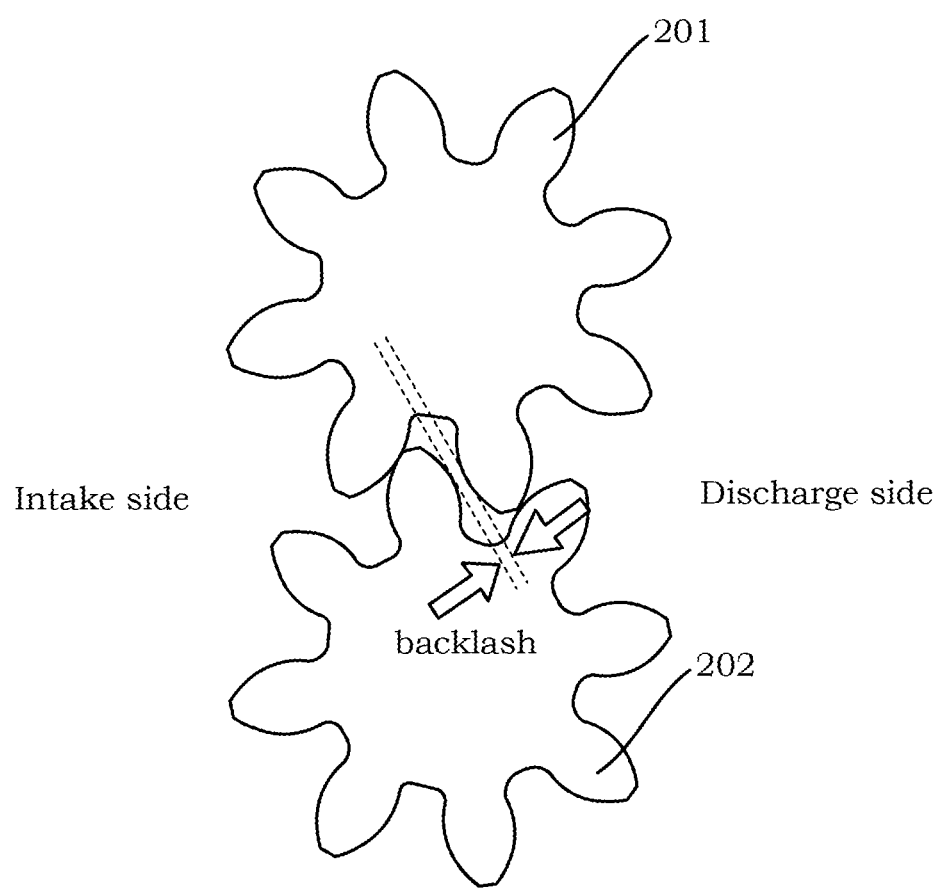
FIG. 5 is a view illustrating gear wheels of the electric oil pump.

Further, as illustrated in FIG. 5, the two gear wheels 201, 202 are assembled with backlash. Their respective teeth tips make contact with each other due to the differential pressure. Accordingly, when the differential pressure is reversed so that the pressure on the intake side becomes higher than that on the discharge side, the direction of the backlash is also reversed, so that gear rattle noise or vibration occurs. Further, in a case where no differential pressure is caused, the force to press the two gear wheels 201, 202 against each other disappears, so that gear rattle noise or vibration easily occurs.

With the present embodiment, it is possible to restrain the occurrence of gear rattle noise and vibration as described below.

Figure 6:
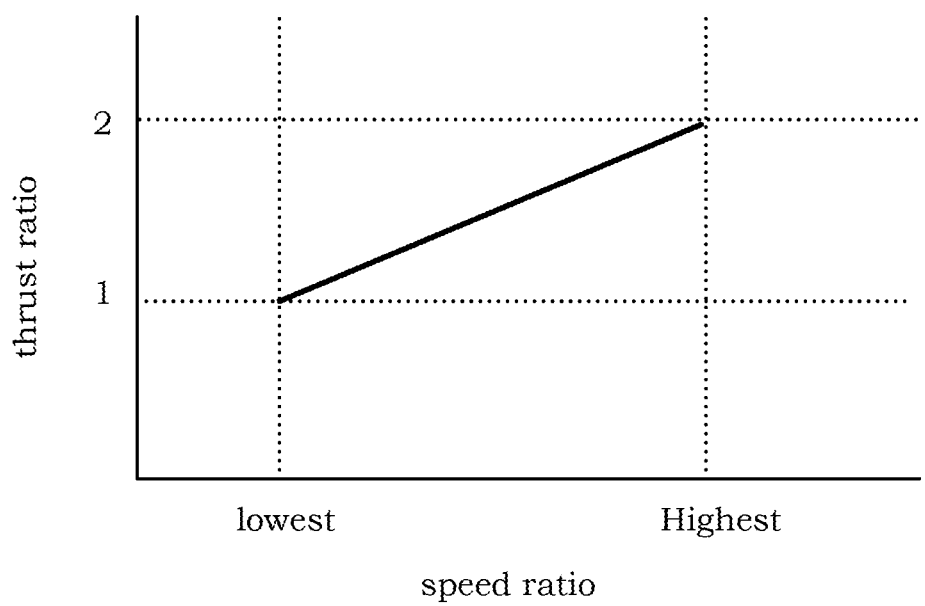
FIG. 6 is a view illustrating a relationship between a thrust ratio and a speed ratio.

FIG. 6 is a view illustrating one example of a relationship between a thrust ratio and a speed ratio in a case where the speed ratio is fixed to a predetermined speed ratio in a state (hereinafter also referred to as "drive state") where a torque is transmitted from the engine 1 to the driving wheels 6. The thrust ratio as used herein is a value obtained by dividing the PRI thrust by the SEC thrust.

Figure 7:
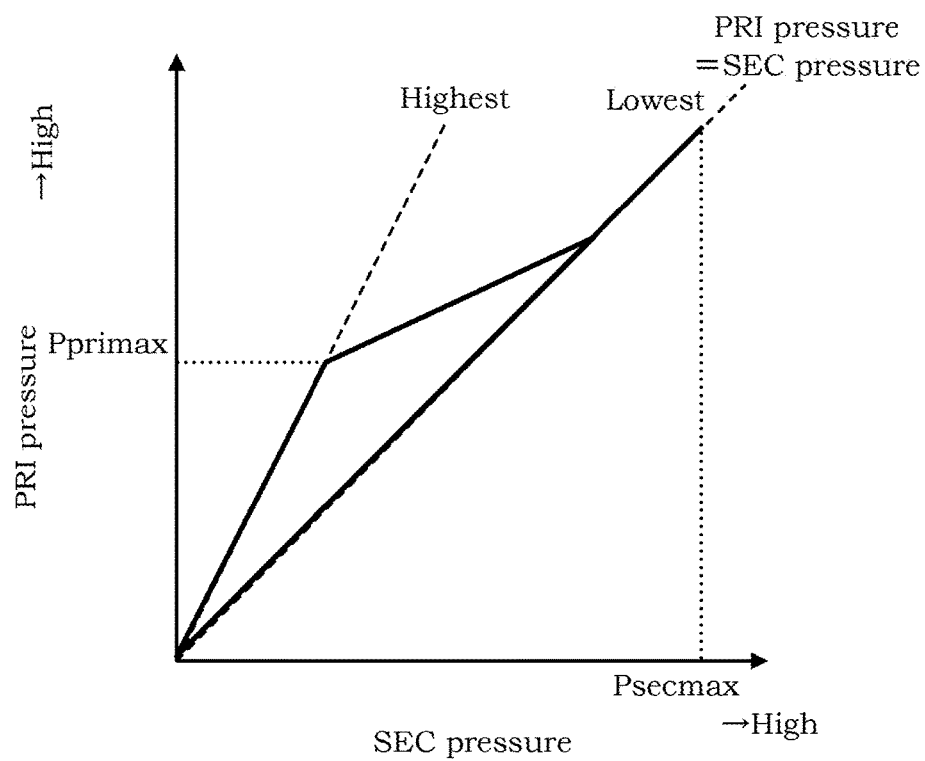
FIG. 7 is a view illustrating one example of use regions of a PRI pressure and an SEC pressure.
Figure 8:
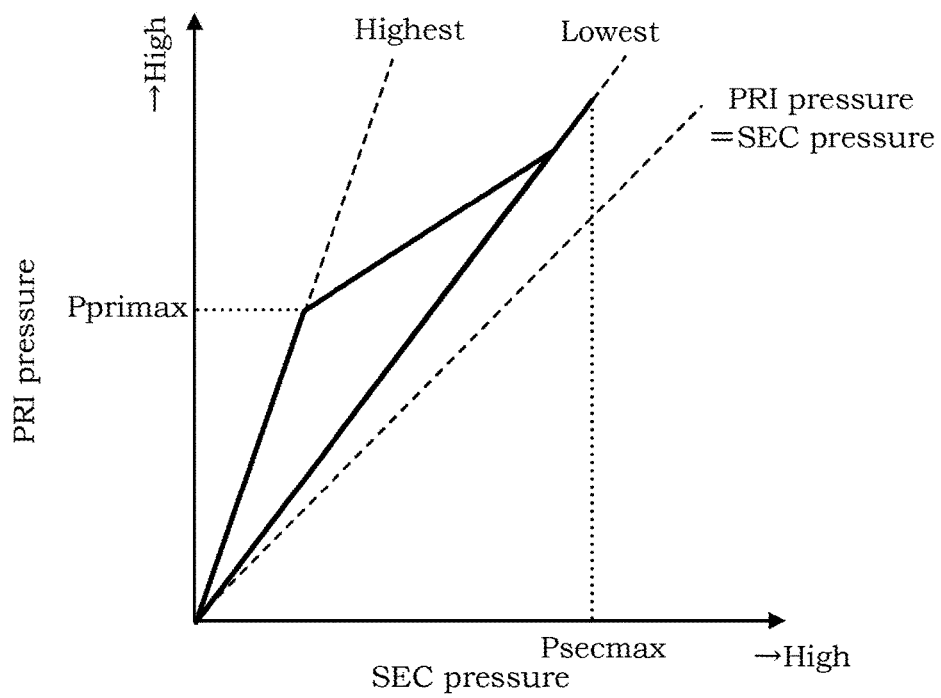
FIG. 8 is a view illustrating another example of the use regions of the PRI pressure and the SEC pressure.

As illustrated in the figure, in the case where the speed ratio is fixed, when the speed ratio is lowest, the thrust ratio is 1. As the speed ratio is shifted toward the high side, the thrust ratio increases proportionally, and when the speed ratio is highest, the thrust ratio is 2. When this relationship is rewritten by setting the PRI pressure in the vertical axis and the SEC pressure in the horizontal axis, FIGS. 7, 8 are obtained. FIG. 7 illustrates a case of PRI piston area=SEC piston area, and FIG. 8 illustrates a case of PRI piston area<SEC piston area. When an upper limit of the PRI pressure to be actually used is Pprimax and an upper limit of the SEC pressure to be actually used is Psecmax, a part surrounded by a continuous line is a region to be actually used in FIGS. 7, 8. The following describes each of the figures.

As illustrated in FIG. 7, in the case of PRI piston area=SEC piston area, PRI pressure=SEC pressure is established at the lowest speed ratio at which the thrust ratio is 1. That is, the shift oil pump 112 is used in a region where gear rattle noise or vibration as described in FIGS. 5, 6 might occur.

On the other hand, in the case of PRI piston area<SEC piston area, the PRI pressure is higher than that in the case of PRI piston area=SEC piston area as described above, so that the PRI pressure is higher than the SEC pressure even in a case of the lowest speed ratio at which the thrust ratio is 1. As a result, as illustrated in FIG. 8, even in the case of the lowest speed ratio, PRI pressure=SEC pressure is not established. In other words, PRI pressure >SEC pressure is established continuously. Accordingly, the occurrence of gear rattle noise and vibration can be restrained.

As described above, in the present embodiment, the electric oil pump 123 disposed in the oil path (the shift oil path 106) between the piston oil chamber (the PRI pulley oil chamber 41c) of the primary pulley 41 and the piston oil chamber (the SEC pulley oil chamber 42c) of the secondary pulley 42, and a controlling portion (the controller 10) configured to control the entry and exit of oil in the PRI oil chamber 41c by the electric oil pump 123 are provided. The piston area of the primary pulley 41 is smaller than the piston area of the secondary pulley 42. Hereby, the pump necessary output decreases, thereby making it possible to achieve downsizing of the electric oil pump 123.

Second Embodiment

The present embodiment is the same as the first embodiment in that the PRI piston area is set to be smaller than the SEC piston area, but the present embodiment also considers other elements as well as the viewpoint of the downsizing of the electric oil pump 123 on setting the PRI piston area. The following describes each element to be considered.

Component Durability

Figure 9:
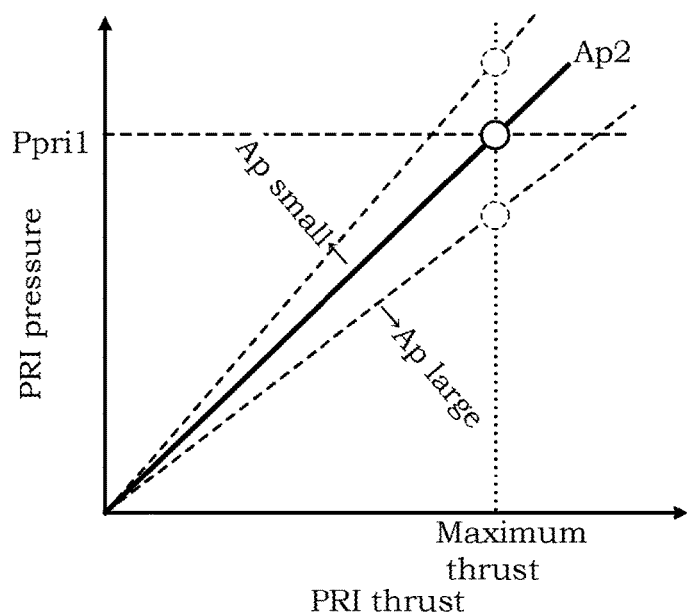
FIG. 9 is a view to describe a PRI piston area lower limit determined from component durability.

FIG. 9 is a view with the vertical axis being taken as PRI pressure and the horizontal axis being taken as PRI thrust and illustrates a relationship between the PRI piston area and the PRI pressure at a maximum thrust. The maximum thrust as used herein is a thrust necessary to achieve a predetermined speed ratio under the strictest condition, that is, at the time when the speed ratio is the lowest speed ratio and a torque transmitted from the engine 1 is a maximum torque.

As illustrated in FIG. 9, as the PRI piston area is made smaller, the PRI pressure at the same thrust becomes higher. On this account, component durability such as a pressure resistance of a sealing member or the like used for the hydraulic circuit or a component strength of a pipe, a joint, or the like becomes a problem.

In view of this, an upper limit (Ppri1) of the PRI pressure is found based on the component durability, and the PRI piston area is set so that the maximum thrust does not exceed this. In FIG. 9, a minimum value of the PRI piston area is a PRI piston area Ap2 at which the maximum thrust is Ppri1.

Leak Characteristic

Figure 10:
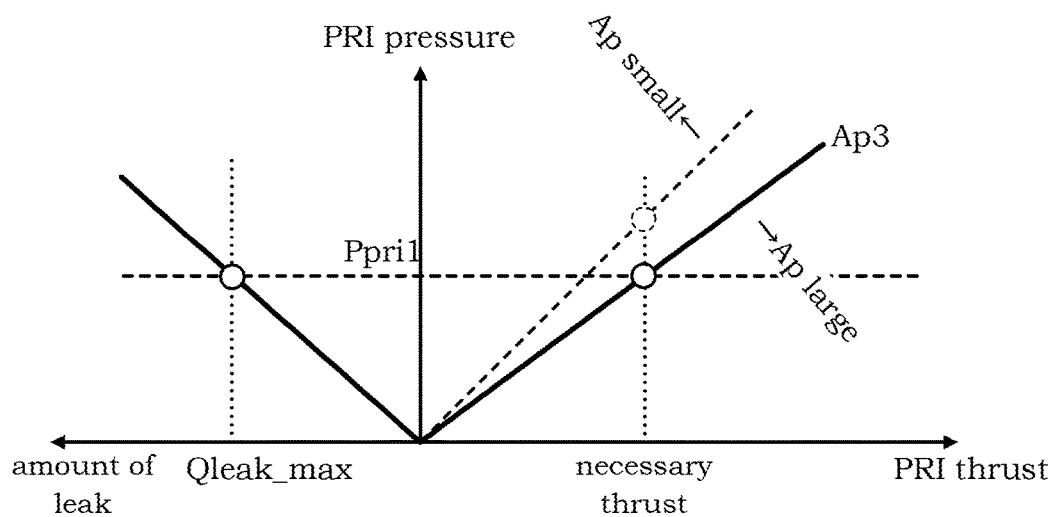
FIG. 10 is a view to describe a PRI piston area lower limit determined from a leak characteristic.

FIG. 10 is a view illustrating a relationship between the PRI pressure and the PRI thrust on the first quadrant and a relationship between the PRI pressure and an amount of leak on the second quadrant. A necessary thrust as used herein is a thrust necessary to achieve a given speed ratio. Under the strictest condition, that is, at the time when the speed ratio is the lowest speed ratio and the torque transmitted from the engine 1 is the maximum torque, necessary thrust=maximum thrust is established. Further, the amount of leak as used herein is an amount of leak in the PRI pulley oil chamber 41c.

As illustrated in FIG. 10, the amount of leak becomes larger as the PRI pressure becomes higher. When a leak occurs in the PRI pulley oil chamber 41c, an amount corresponding to the leak is compensated by the source-pressure oil pump 101 or the line-pressure electric oil pump 111. That is, the amount of leak (hereinafter also referred to as "supply flow rate limiting value") that can be compensated is determined by a discharge capacity of the source-pressure oil pump 101 or the like.

Further, as illustrated in FIG. 10, the PRI pressure at the time when the necessary thrust is generated becomes higher as the PRI piston area becomes smaller.

In view of this, the PRI pressure is assumed to be Ppri1 when the upper limit of the amount of leak that can be compensated by the source-pressure oil pump 101 or the like is Qleak_max. That is, the upper limit of the PRI pressure, determined based on the amount of leak, is assumed to be Ppri1. The PRI piston area is set so that the necessary thrust can be generated at the time when the PRI pressure is Ppri1 as the upper limit. In FIG. 10, a minimum value of the PRI piston area is a PRI piston area Ap3 with which the necessary thrust is generated at the time when the PRI pressure is Ppri1. This is because, when the PRI piston area is smaller than Ap3, the PRI pressure at the time when the necessary thrust is generated becomes higher than Ppri1.

Note that, as the discharge capacity of the source-pressure oil pump 101 or the like is made higher, Qleak_max increases, and Ppri1 also becomes higher, so that the PRI piston area can be made smaller. As a result, it is possible to further downsize the electric oil pump 123. However, even if the electric oil pump 123 can be downsized, the source-pressure oil pump 101 or the like is upsized. That is, at the time when the PRI piston area is set based on the leak characteristic, it is necessary to take a balance between downsizing of the electric oil pump 123 and upsizing of the source-pressure oil pump 101 or the like, in consideration of the supply flow rate limiting value.

A magnitude relationship between a lower limit Ap2 of the PRI piston area based on the component durability and a lower limit Ap3 of the PRI piston area based on the leak characteristic is determined by a specification or the like of a continuously variable transmission to which the present embodiment is applied.

In view of this, in the present embodiment, the lower limit Ap2 of the PRI piston area based on the component durability and the lower limit Ap3 of the PRI piston area based on the leak characteristic are calculated, and a smallest PRI piston area satisfying both lower limits is employed. Of course, it is premised that the PRI piston area is set to be smaller than the SEC piston area as described in the first embodiment.

Note that the minimum value Ap1 of the PRI piston area as described in the first embodiment and Ap2, Ap3 as described in the present embodiment may be calculated, and a minimum value satisfying all of them may be employed.

As described above, in the present embodiment, based on the leak characteristic of the oil path to the hydraulic pressure of the PRI pulley oil chamber 41c, the piston area of the primary pulley 41 is set to a magnitude at which the amount of leak in the oil path at the time when the thrust of the primary pulley 41 is maximum does not exceed a supply flow rate limiting value set in advance. Hereby, it is possible to surely compensate an amount of oil leaking out. Further, it is possible to restrain upsizing of the source-pressure oil pump 101 or the like due to a decrease of the piston area of the primary pulley 41.

Further, in the present embodiment, the piston area of the primary pulley 41 is set to a magnitude at which the hydraulic pressure of the piston oil chamber of the primary pulley 41 at the time when the thrust of the primary pulley 41 is maximum does not exceed an upper limit hydraulic pressure determined based on a component pressure resistance. Hereby, it is possible to secure the component durability. Further, it is possible to restrain an increase in cost due to an increase of requested component durability.

In the meantime, that the downsizing of the electric oil pump 123 can be achieved by setting the PRI piston area to be smaller than the SEC piston area is peculiar to the shift circuit 110 illustrated in FIG. 2. That is, the first and second embodiments are achievable on the premise that the shift circuit 110 is configured such that the electric oil pump 123 is disposed in the oil path between the PRI pulley oil chamber 41c and the SEC pulley oil chamber 42c and the entry and exit of oil in the PRI pulley oil chamber 41c is controlled by the electric oil pump 123.

In a hydraulic circuit for a shift (described later) that is generally used in the related art, the PRI piston area cannot be set to be smaller than the SEC piston area. This will be described with reference to FIG. 11.

Figure 11:
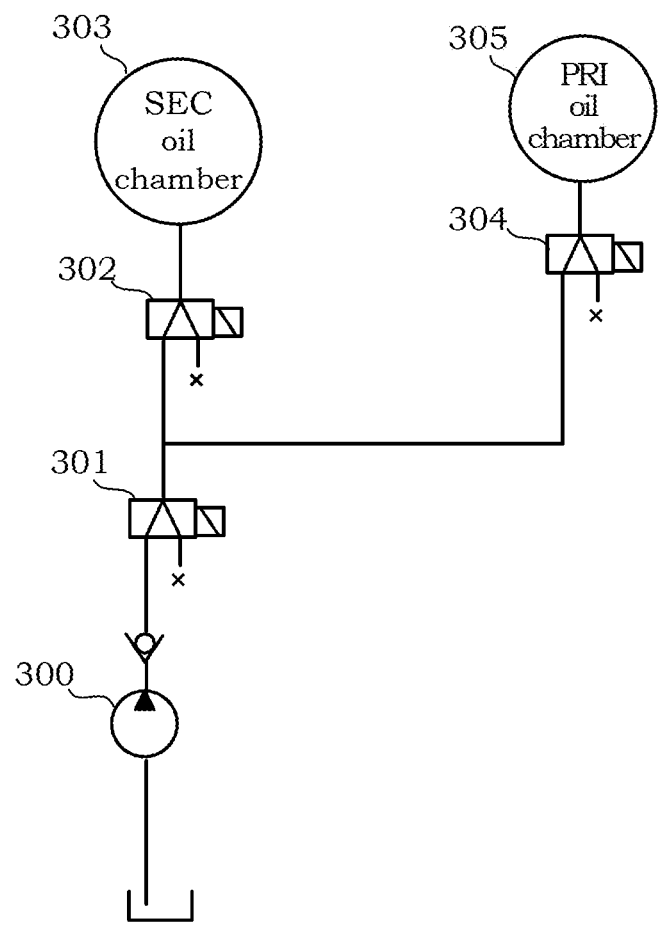
FIG. 11 is a schematic view illustrating a general hydraulic circuit.

FIG. 11 is a view of a hydraulic circuit generally known in the related art, the hydraulic circuit being configured to control a flow rate to be supplied to a PRI oil chamber and a hydraulic pressure in SEC pulley oil chamber by reducing a hydraulic pressure generated by a source-pressure oil pump.

In the configuration of FIG. 11, a hydraulic pressure generated by an oil pump 300 is reduced by a pressure regulator 301 and is further adjusted by an SEC pressure regulator 302 and a PRI pressure regulator 304, so as to control oil amounts of an oil chamber of an SEC pulley oil chamber 303 and a PRI oil chamber 305. That is, in the configuration of FIG. 11, it is difficult to adjust the hydraulic pressure to be higher than the hydraulic pressure generated by the oil pump 300.

Further, in the configuration of FIG. 11, a PRI thrust is expressed by a product between a pressure Ppri reduced by the pressure regulator 304 and a PRI piston area, and an SEC thrust is expressed by a product between a pressure Psec reduced by the pressure regulator 302 and an SEC piston area. At the time of up-shift, it is necessary that the PRI thrust be made larger than the SEC thrust, and therefore, in a case where the PRI piston area is equal to the SEC piston area, the hydraulic pressure to be generated by the oil pump 300 for source pressure must be at least Ppri or more. Further, it is necessary to keep the SEC thrust at a magnitude at which belt slip does not occur, and therefore, the pressure Psec cannot be made small for the up-shift. In order to achieve downsizing of the oil pump 300 for source pressure in such a configuration, the PRI thrust must be increased by setting the PRI piston area to be larger than the SEC piston area. That is, in a case where the downsizing of the oil pump 300 is achieved in the configuration of FIG. 11, the magnitude relationship between the PRI piston area and the SEC piston area is reverse to those in the first embodiment and the second embodiment.

The embodiments of the present invention have been described above, but the embodiments just exemplify some applications of the present invention and are not intended to limit the technical scope of the present invention to the concrete configurations of the embodiments.

The invention claimed is:

1. A continuously variable transmission comprising:
    an electric oil pump disposed in an oil path between a piston oil chamber of a primary pulley and a piston oil chamber of a secondary pulley; and
    a controlling portion configured to control entry and exit of oil in the piston oil chamber of the primary pulley by the electric oil pump, wherein
    a piston area of the primary pulley is smaller than a piston area of the secondary pulley, and is set to a minimum magnitude satisfying a lower limit of an area at which:
        (i) an amount of leak in the oil path at a time when a thrust of the primary pulley is maximum does not exceed a supply flow rate limiting value set in advance based on a leak characteristic of the oil path to a hydraulic pressure of the piston oil chamber of the primary pulley, and
        (ii) a hydraulic pressure of the piston oil chamber of the primary pulley at a time when a thrust of the primary pulley is maximum does not exceed an upper limit hydraulic pressure determined based on a pressure resistance of a component used in a hydraulic circuit.

* * * * *